(12) United States Patent
Yoon

(10) Patent No.: US 10,160,389 B2
(45) Date of Patent: Dec. 25, 2018

(54) CARGO SCREEN ASSEMBLY, METHOD OF OPERATING THE SAME AND METHOD OF RELEASING THE SAME

(71) Applicants: Hyundai Motor Company, Seoul (KR); Kia Motors Corporation, Seoul (KR)

(72) Inventor: Yeon-Sim Yoon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 14 days.

(21) Appl. No.: 15/371,076

(22) Filed: Dec. 6, 2016

(65) Prior Publication Data

US 2017/0327047 A1    Nov. 16, 2017

(30) Foreign Application Priority Data

May 13, 2016    (KR) .......................... 10-2016-0058832

(51) Int. Cl.
*B60R 5/04*    (2006.01)
(52) U.S. Cl.
CPC .................................... *B60R 5/047* (2013.01)
(58) Field of Classification Search
CPC ..................................................... B60R 5/047
See application file for complete search history.

(56) References Cited

U.S. PATENT DOCUMENTS

2014/0015270 A1*    1/2014  Staib ...................... B60R 5/047
                                                                296/24.43

FOREIGN PATENT DOCUMENTS

| KR | 1999-005528 U | 2/1999 |
| KR | 10-2011-0005952 A | 1/2011 |
| KR | 10-2013-0067884 A | 6/2013 |
| KR | 10-2013-0101195 A | 9/2013 |

* cited by examiner

*Primary Examiner* — D Glenn Dayoan
*Assistant Examiner* — Melissa A Black
(74) *Attorney, Agent, or Firm* — Morgan, Lewis & Bockius LLP

(57) ABSTRACT

A cargo screen assembly for opening or closing an upper portion of a cargo space defined between a rear seat and a back door of a vehicle, the cargo screen assembly may include a cargo screen rail mounting groove formed horizontally in a rear surface of the rear seat of the vehicle, a plurality of side trims protruding rearward from respective opposite end portions of the rear surface of the rear seat, and a plurality of cargo screen rails configured to be inserted into the respective side trims or the cargo screen rail mounting groove.

22 Claims, 13 Drawing Sheets

CARGO SCREEN ASSEMBLY, METHOD OF OPERATING THE SAME AND METHOD OF RELEASING THE SAME

CROSS-REFERENCE(S) TO RELATED APPLICATIONS

The present application claims priority to Korean Patent Application No. 10-2016-0058832, filed on May 13, 2016, the entire contents of which is incorporated herein for all purposes by this reference.

BACKGROUND OF THE INVENTION

Field of the Invention

The present invention relate to a cargo screen assembly, a method of operating the same and a method of releasing the same; and, particularly, to a cargo screen assembly which does not need an operation of mounting or detaching cargo screens and facilitates a process of operating of the cargo screens, and a method of operating the same and a method of releasing the same.

Description of Related Art

Although typical sedans are configured such that a trunk room in which luggage can be loaded is formed as an independent space, vehicles such as wagons, SUVs and MPVs are configured such that space defined immediately behind a rear seat functions as a trunk room, that is, a cargo space, and the trunk room communicates with the passenger compartment.

When seen in the passenger compartment, pieces of luggage loaded in the cargo space are directly exposed. Thus, the appearance may be deteriorated, and there is a risk of theft. Given this, a cargo screen is used to prevent exposure of luggage, thus improving the appearance, and providing an anti-theft function.

Referring to FIGS. 1 and 2, a method of using a conventional cargo screen includes: a cargo screen mounting step of inserting, by a user, opposite ends of the cargo screen into mounting grooves formed in respective side trims; a deploying step of pulling, by the user himself/herself, an exposed grip handle provided in a front end of the cargo screen to deploy the screen toward the rear of the vehicle; and a fastening step of inserting a hanger of the deployed screen into a locking depression formed in the side trim.

To fold the rear seat and load a comparatively long luggage, the cargo screen must be detached. To use the cargo screen again which has been detached, user must re-perform mounting, deploying and fastening step.

Also, in case of the conventional cargo screen, there is a disadvantage in that, to detach or mount the cargo screen, the user may have to place his/her knees on a bumper edge, and bend his/her back and enter the trunk room to hold the handle of the cargo screen. Furthermore, in the case where the distance between the rear seat and the bumper edge is comparatively large, there is a problem in that, when it is desired to operate the cargo screen, a child or woman who is short may not reach the handle of the cargo screen. As such, the degree of practical usage of the cargo screen may be markedly reduced.

In addition, when the conventional cargo screen is mounted to or detached from the side trims, force of approximately 49 N to 59 N is required. Furthermore, to pull the conventional cargo screen, force of approximately 37 N to 60 N is required. As such, because comparatively large force is required to mount, detach or operate the conventional cargo screen, it may difficult for a child or woman to use the cargo screen.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cargo screen assembly which is configured such that a rail of a cargo screen can be mounted to or released from a rear surface of a rear seat, and a method of operating the same and a method of releasing the same.

Other objects and advantages of the present invention can be understood by the following description, and become apparent with reference to the embodiments of the present invention. Also, it is obvious to those skilled in the art to which the present invention pertains that the objects and advantages of the present invention can be realized by the device as claimed and combinations thereof.

In accordance with an exemplary embodiment of the present invention, there is provided a cargo screen assembly for opening or closing an upper portion of a cargo space defined between a rear seat (100) and a back door of a vehicle, the cargo screen assembly including: a cargo screen rail mounting groove (110) formed horizontally in a rear surface of the rear seat (100) of the vehicle; a plurality of side trims (200) protruding rearward from respective opposite end portions of the rear surface of the rear seat (100); and a plurality of cargo screen rails (300) configured to be inserted into the respective side trims (200) or the cargo screen rail mounting groove (110).

The cargo screen rail (300) may include: a rotation shaft (310) mounted to a first end portion of each of the cargo screen rails (300) and configured to rotate the corresponding cargo screen rail (300) in a first direction so that the cargo screen rail (300) is inserted into the associated side trim (200), or to rotate the cargo screen rail (300) in a second direction so that the cargo screen rail (300) is inserted into the cargo screen rail mounting groove (110).

The cargo screen assembly may further include: a gear spring assembly (400) mounted to the rotation shaft (310) and configured to rotate the corresponding cargo screen rail (300) in the second direction.

The cargo screen assembly may further include: cargo screens (500) each including a first end portion mounted in the corresponding side trim (200), and a second end portion provided to be movable along the corresponding cargo screen rail (300) mounted in the cargo screen rail mounting groove (110).

Each of the cargo screens (500) may include: a wheel (510) mounted to one side of the second end portion of the cargo screen (500) and inserted into the corresponding cargo screen rail (300) to be movable along the cargo screen rail (300); and a coupling part (520) mounted to the second end portion of the cargo screen (500), the coupling part (520) being coupled to the second end portion of the opposite side cargo screen (500) to close the upper portion of the cargo space.

Each of the cargo screens (500) may include a plurality of panels (530). When the second end portion of the cargo screen (500) is moved into the corresponding side trim (200), the plurality of panel (530) may be stacked inside the side trim (200) or wound in a form of a roll inside the side trim (200) to open the upper portion of the cargo space. When the second end portion of the cargo screen (500) is moved along the corresponding cargo screen rail (300), the plurality of panels (530) may be deployed along the cargo screen rail (300) or unwound in a form of a roll to close the upper portion of the cargo space.

The cargo screen assembly may further include: a latch structure (600) mounted in each of the side trim (200) at a point at which the side trim (200) makes contact with the second end portion of the corresponding cargo screen rail (300), the latch structure (600) being configured to lock the cargo screen rail (300) to the side trim (200) or release the cargo screen rail (300) from the side trim (200).

The latch structure (600) may be configured such that, while the cargo screen rail (300) is locked to the side trim (200), when force is applied to the second end portion of the cargo screen rail (300) in the first direction, the latch structure (600) is unlatched.

The gear spring assembly (400) may include: a coil spring (410) configured to apply force to the rotation shaft (310) so that the cargo screen rail (300) rotates in the second direction; and a gear damper (420) configured to reduce a speed at which the rotation shaft (310) rotates.

The rotation shaft (310) may include a protrusion (311) protruding vertically from the rotation shaft (310). The gear spring assembly (400) may include a rack gear (430) configured such that when the rotation shaft (310) rotates in the second direction, a first end portion of the rack gear (430) comes into contact with the protrusion (311), and a rotational motion of the rotation shaft (310) is converted into a linear motion by the contact, whereby the rack gear (430) is moved away from the rotation shaft (310).

The gear spring assembly (400) may include: a pinion gear (440) configured to be rotated by movement of the rack gear (430); and a gear link (450) configured to transmit rotating force of the pinion gear (440) to the rotation shaft (310) and rotate the rotation shaft (310) in the second direction.

The gear spring assembly (400) may further include: a rack gear spring (460) mounted to a second end portion of the rack gear (430) so that when the rotation shaft (310) rotates in the second direction, the rack gear spring (460) is compressed by movement of the rack gear (430).

The gear spring assembly (400) may further include: a locking device (470) configured to maintain the rack gear spring (460) in a compressed state when the cargo screen rail (300) is mounted in the cargo screen rail mounting groove (110) by rotation of the rotation shaft (310) in the second direction.

The gear spring assembly (400) may further include: a button device (480) configured to release the rack gear (430) from the locking device (470) through a link structure (481) so that the rotation shaft (310) is rotated in the first direction by restoring force of the rack gear spring (460).

The rotation shaft (310) may include a protrusion (311) protruding vertically from the rotation shaft (310). The gear spring assembly (400) may include: a second rack gear (430'); a second pinion gear (440') configured to be rotated by movement of the second rack gear (430'); a second gear link (450') configured to transmit rotating force of the second pinion gear (440') to the rotation shaft (310) and rotate the rotation shaft (310) in the second direction; and a second rack gear spring (460') mounted to a first end portion of the second rack gear (430') and configured to apply restoring force to the second rack gear (430') so that the second rack gear (430') is moved.

The gear spring assembly (400) may further include: a second locking device (470') configured to maintain the second rack gear spring (460') in a compressed state and configured such that, when the rotation shaft (310) rotates in the second direction, the second locking device (470') is unlatched by the protrusion (311).

The gear spring assembly (400) may further include: a second button device (480') configured to apply force to the second rack gear (430') through a second link structure (481') in a direction in which the second rack gear spring (460') is compressed, so that the second rack gear spring (460') is maintained in the state of having been compressed by the second locking device (470').

In accordance with another exemplary embodiment of the present invention, there is provided a method of operating the cargo screen assembly, including: an operation (S100) of applying force to the second end portion of each of the cargo screen rails (300) in the first direction to release the corresponding latch structure (600), and releasing the cargo screen rail (300) from the corresponding side trim (200); a first rotation operation (S200) of rotating the rotation shaft (310) of the cargo screen rail (300) in the second direction by restoring force of the coil spring (410); an operation (S300) of bringing the protrusion (311) of the rotation shaft (310) into contact with the rack gear (430) and thus moving the rack gear (430) in a direction away from the rotation shaft (310); an operation (S400) of rotating the pinion gear (440) by the movement of the rack gear (430), and transmitting rotating force of the pinion gear (440) to the rotation shaft (310) through the gear link (450); and an operation (S500) of mounting the cargo screen rail (300) in the cargo screen rail mounting groove (110) using the rotating force.

The method may further include: an operation (S600) of moving each of the cargo screens (500) along the cargo screen rail (300) mounted in the cargo screen rail mounting groove (110), and coupling the cargo screen (500) with the opposite side cargo screen (500) to close the upper portion of the cargo space.

In accordance with another exemplary embodiment of the present invention, there is provided a method of releasing a mounting structure of the cargo screen assembly, including: an operation (S100') of separating the cargo screens (500) that have been coupled to each other, and moving each of the cargo screens (500) into the corresponding side trim (200); an operation (S200') of operating the button device (480) to release the locking device (470) through the link structure, and moving the rack gear (430) toward the protrusion (311) using restoring force of the rack gear spring (460); an operation (S300') of applying force from the rack gear (430) to the protrusion (311) and rotating the rotation shaft (310) in the first direction; an operation (S400') of inserting each of the cargo screen rails (300) into the corresponding side trim (200) by applying force to the second end portion of the cargo screen rail (300) in the first direction after the operation (S300'); and an operation (S500') of locking the cargo screen rail (300) in the side trim (200) by the latch structure (600).

In accordance with another exemplary embodiment of the present invention, there is provided a method of operating the cargo screen assembly, including: an operation (S10) of applying force to the second end portion of each of the cargo screen rails (300) in the first direction to release the corresponding latch structure (600), and releasing the cargo screen rail (300) from the corresponding side trim (200); a first rotation step (S20) of rotating the rotation shaft (310) of the cargo screen rail (300) in the second direction by restoring force of the coil spring (410); an operation (S30) of bringing the protrusion (311) of the rotation shaft (310) into contact with a second support (431') of the second rack gear (430') to release the second rack gear (430') from the second locking device (470'), and moving the second rack gear (430') using restoring force of the second rack gear spring (460'); a second rotation operation (S40) of rotating the second pinion gear (440') by the movement of the second rack gear (430'), transmitting rotating force of the second pinion gear (440') to the rotation shaft (310) by the second gear link (450'), and rotating the rotation shaft (310) in the second direction; and an operation (S50) of mounting the cargo screen rail (300) in the cargo screen rail mounting groove (110) using the rotating force.

The method may further include: an operation (S60) of moving each of the cargo screens (500) along the cargo screen rail (300) mounted in the cargo screen rail mounting groove (110), and coupling the cargo screen (500) with the opposite side cargo screen (500) to close the upper portion of the cargo space.

In accordance with another exemplary embodiment of the present invention, there is provided a method of releasing a mounting structure of the cargo screen assembly, including: an operation (S10') of separating the cargo screens (500) that have been coupled to each other, and moving each of the cargo screens (500) into a corresponding side trim (200); an operation (S20') of operating the second button device (480') to move the second rack gear (430') through the second link structure (481') in a direction in which the second rack gear spring (460') is compressed, and maintaining the second rack gear spring (460') in a compressed state using the second locking device (470'); an operation (S30') of rotating the second pinion gear (440') using the movement of the second rack gear (430'), and rotating the rotation shaft (310) in the first direction by rotating force of the second pinion gear (440'); an operation (S40') of inserting each of the cargo screen rails (300) into the corresponding side trim (200) by applying force to the second end portion of the cargo screen rail (300) in the first direction after the operation (S30'); and an operation (S50') of locking the cargo screen rail (300) in the side trim (200) by the latch structure (600).

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
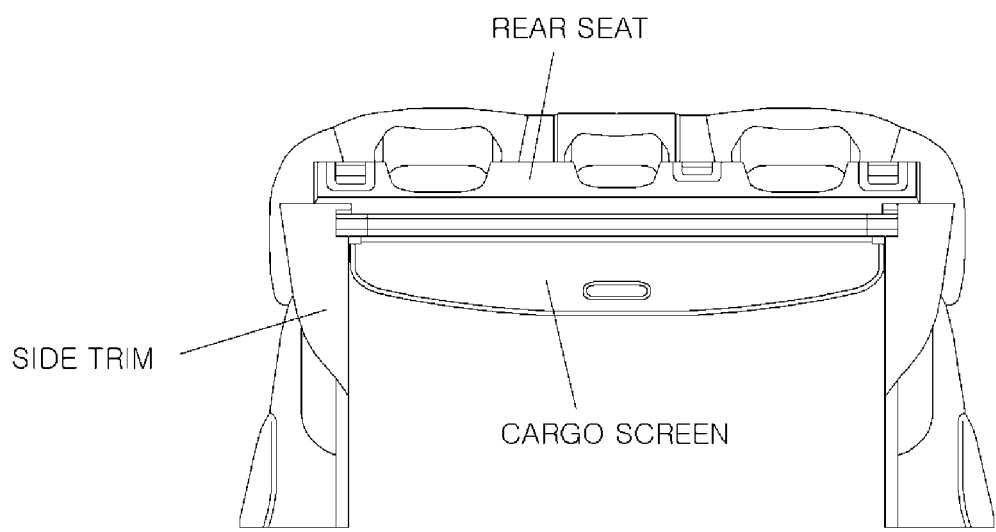
FIG. 1 and FIG. 2 are views illustrating problems of a conventional art.
Figure 2:
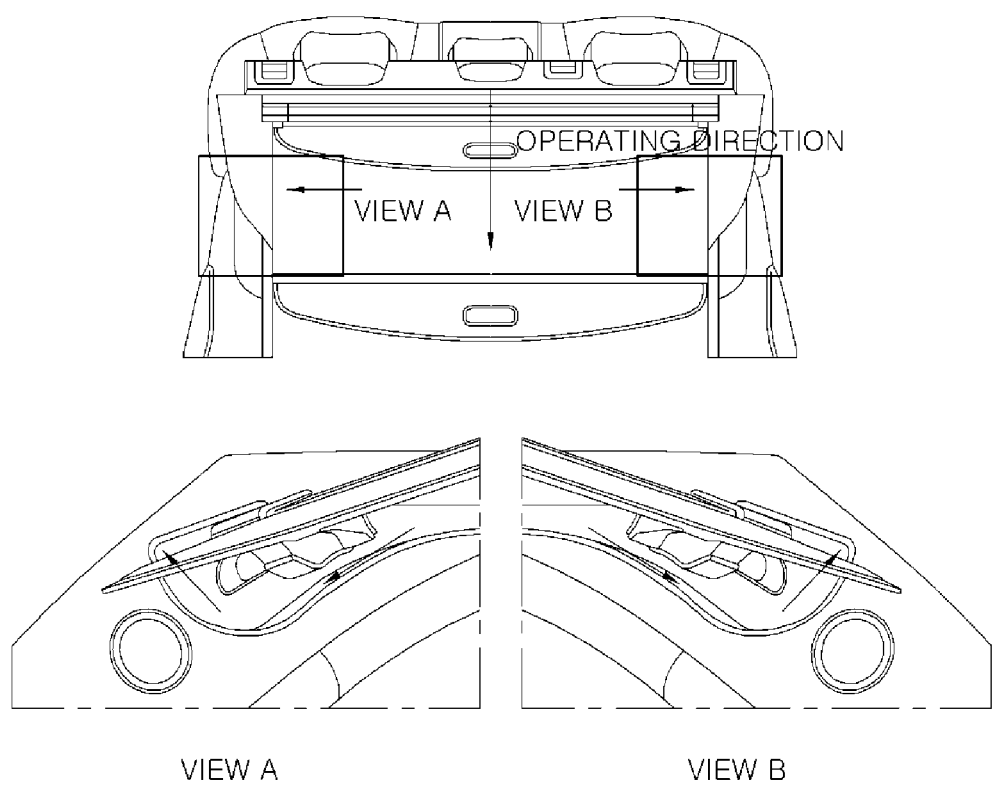

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention may, however, be embodied in different forms and should not be construed as limited to the embodiments set forth herein. In certain embodiments, irrelevant to the present invention may be omitted to avoid obscuring appreciation of the disclosure. Throughout the disclosure, like reference numerals refer to like parts throughout the various figures and embodiments of the present invention.

The drawings are not necessarily to scale and in some instances, proportions may have been exaggerated to clearly illustrate various layers and regions of the embodiments. It will be understood that when an element including a layer, a film, a region, or a plate is referred to as being "above" another element, it can be "immediately above" the other element or intervening elements may also be present.

In contrast, when an element is referred to as being "immediately above" another element, there are no intervening elements present. In addition, it will be understood that when an element is referred to as being "entirely" formed on another element, it can be formed on the entire surface (or whole surface) of the other element or cannot be formed at a portion of the edge portion thereof.

Figure 3:
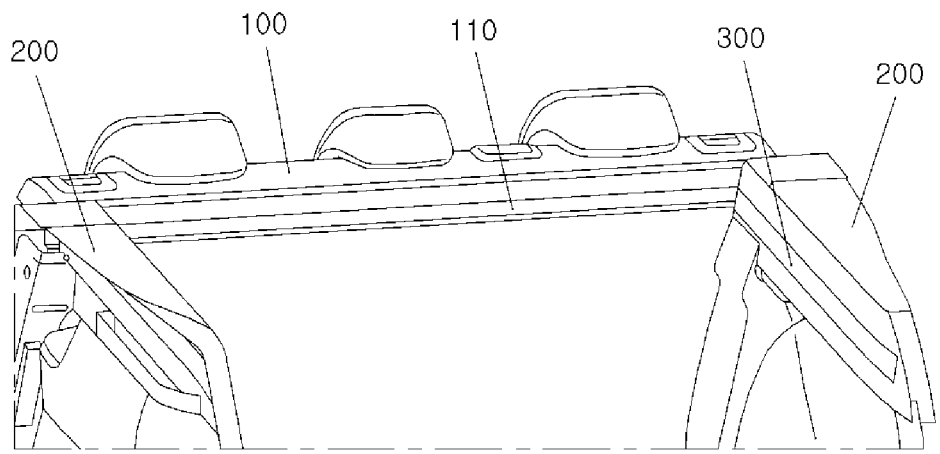
FIG. 3 and FIG. 4 are perspective views of a cargo screen assembly an exemplary embodiment according to an exemplary embodiment of the present invention.
Figure 4:
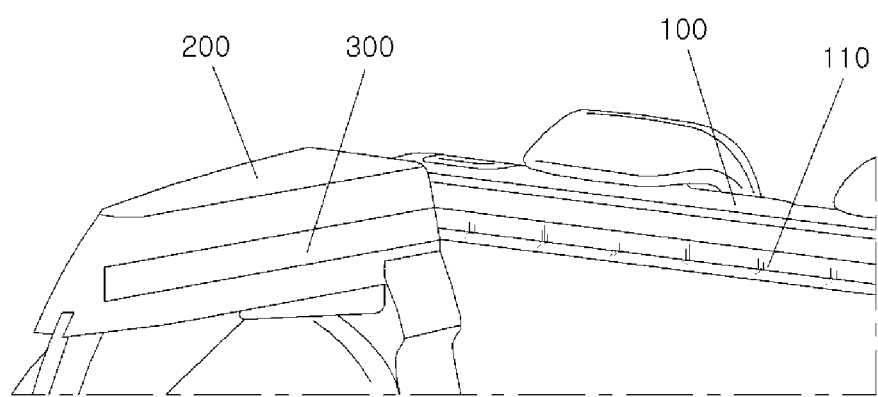
Figure 5:
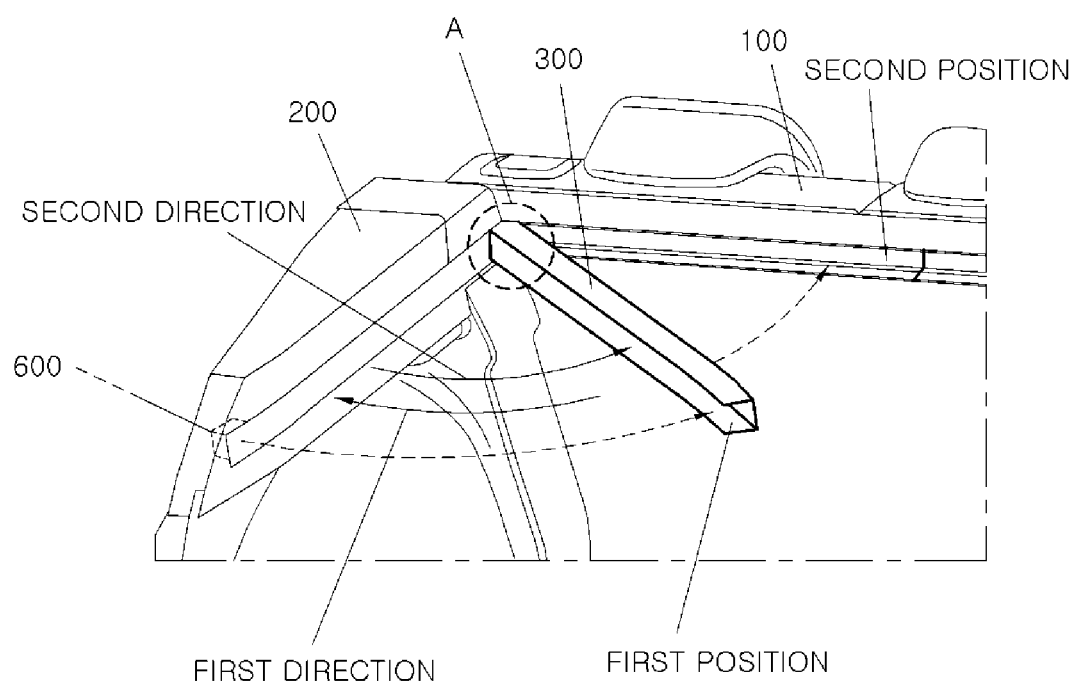
FIG. 5 is a view illustrating the operation of the cargo screen assembly according to an exemplary embodiment of the present invention.

FIG. 3 and FIG. 4 are perspective views of a cargo screen assembly according to an exemplary embodiment of the present invention, and FIG. 5 is a view showing the operation of the cargo screen assembly according to an exemplary embodiment of the present invention. Referring to FIGS. 3 to 5, the cargo screen assembly according to an exemplary embodiment of the present invention is configured to open or close an upper portion of a cargo space defined between a rear seat and a back door of a vehicle.

The cargo screen assembly includes a cargo screen rail mounting groove 110, a side trim 200, a cargo screen rail 300, a gear spring assembly 400, a cargo screen 500 and a latch structure 600. Of them, the gear spring assembly 400 and the cargo screen 500 will be described in detail later herein.

The cargo screen rail mounting groove 110 is horizontally formed in a rear surface of a rear seat 100 of the vehicle. The side trim 200 may comprise a plurality of side trims 200 which protrude rearward from opposite end portions of the rear surface of the rear seat 100. The cargo screen rail 300 may comprise a plurality of cargo screen rails 300 which are inserted into the respective side trims 200 or into the cargo screen rail mounting groove 110.

The latch structure 600 is mounted in each side trim 200 at a position at which the side trim 200 comes into contact with a second end portion of the corresponding cargo screen rail 300. The latch structure 600 is configured to lock the cargo screen rail 300 to the side trim 200 or release the cargo screen rail 300 from the side trim 200.

The latch structure 600 may be configured such that, while the cargo screen rail 300 is locked to the side trim 200, when force is applied to the second end portion of the cargo screen rail 300 in a first direction, the cargo screen rail 300 is released from the side trim 200. For example, the latch structure 600 may have the same structure as that of the publicly known home bar door opening structure (e.g., Korean Patent Laid-open Publication No. 2011-0041658), but it is not limited to this. Depending on intentions of a designer, various structures may be applied to the latch structure 600.

Figure 6:
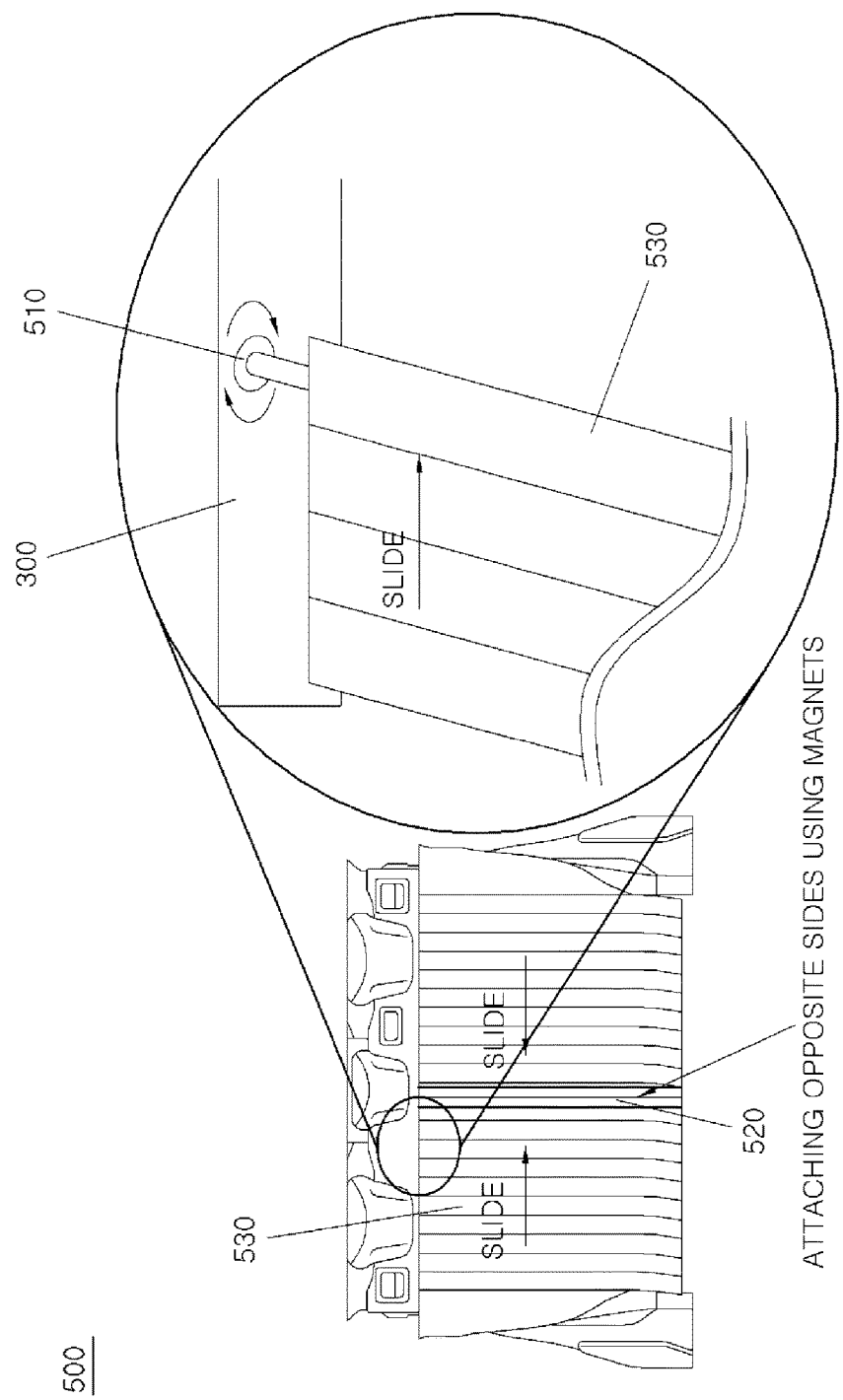
FIG. 6 is a plan view of the cargo screen assembly that is in a closed state, according to an exemplary embodiment of the present invention.

FIG. 6 is a plan view of the cargo screen assembly that is in a closed state, according to an exemplary embodiment of the present invention. Referring to FIG. 6, in an exemplary embodiment of the present invention, a first end portion of the cargo screen 500 is mounted in the side trim 200, and a second end portion thereof is movable along the cargo screen rail 300 mounted in the cargo screen rail mounting groove 110.

The cargo screen 500 includes a wheel 510, a coupling part 520 and a panel 530. The wheel 510 is mounted to one side of the second end portion of the cargo screen 500 and inserted into the cargo screen rail 300 to be movable along the cargo screen rail 300. Thanks to the wheel 510, the force required to operate the cargo screen is the maximum 15 N. This is a value reduced by 22 N to 45 N, compared to the force required to operate the conventional cargo screen. That is, as described above, because the rotating wheel 510 is inserted into the cargo screen rail 300, the cargo screen 500 can be easily operated.

The coupling part 520 is mounted to the second end portion of the cargo screen 500 and is a component which is coupled to the second end portion of the opposite side cargo screen 500 to close the upper portion of the cargo space. The coupling part 520 is formed of magnetic material. Therefore, required in the conventional cargo screen, an operation of inserting and locking the hanger of the pull-out screen into and to a locking hole formed in the side trim is not required in an exemplary embodiment of the present invention. In other words, an operation of fixing the cargo screens 500 is completed only by attaching the coupling parts 520 that are formed of magnetic material to each other. Therefore, the operation of fixing the cargo screens 500 can be facilitated.

Each cargo screen 500 includes a plurality of panels 530. When the second end portion (that is, among the panels, the panel farthest away from the panel mounted to the side trim) of the cargo screen 500 is moved into the side trim 200, the plurality of panels 530 are stacked in the side trim 200, and the upper portion of the cargo space opens. When the second end portion (that is, among the panels, the panel farthest away from the panel mounted to the side trim) of the cargo screen 500 is moved along the cargo screen rail 300, the plurality of panels 530 are successively disposed along the cargo screen rail 300, and the upper portion of the cargo space is closed. That is, the cargo screen 500 is stacked or deployed in the same manner as that of a slide screen. Furthermore, the cargo screen 500 may be wound or unwound in a form of a roll.

Although force of approximately 37 N to 60 N has been required to pull the conventional roll-type cargo screen, the maximum force required to operate the cargo screen 500 according to an exemplary embodiment of the present invention is only 15 N. This is a value which is reduced by approximately 22 N to 45 N compared to the force required to operate the conventional cargo screen. Accordingly, in the case where such a slide screen structure is used, a child, woman or the like can also easily operate the cargo screen 500.

Figure 7:
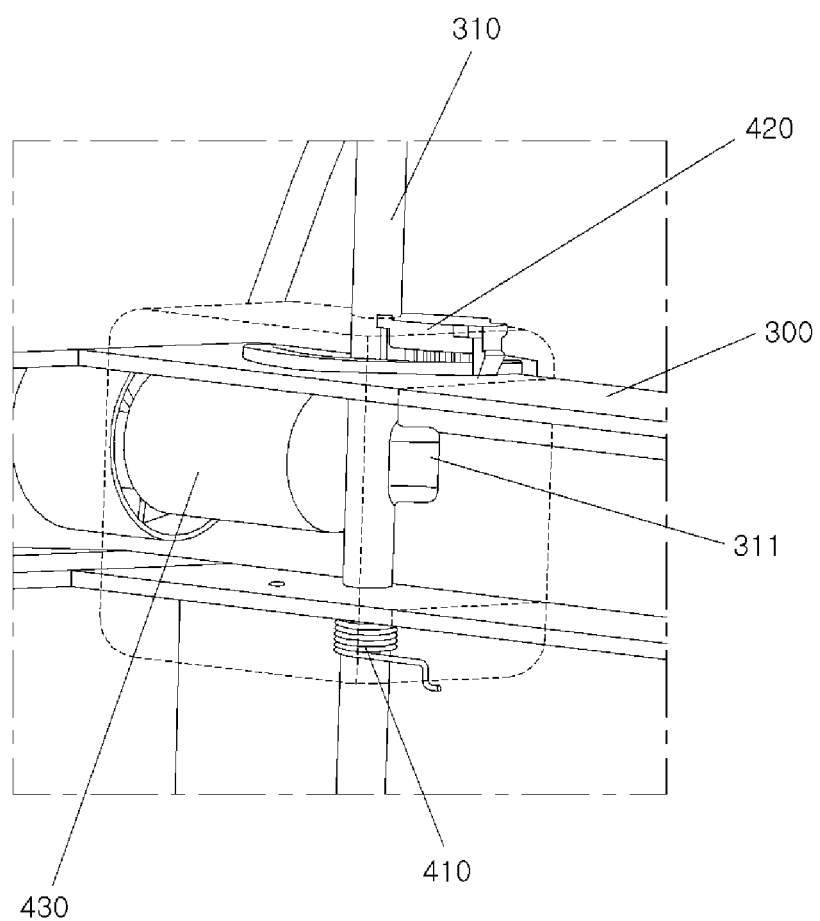
FIG. 7 is an enlarged view of portion A of FIG. 5.

FIG. 7 is an enlarged view of portion A of FIG. 5. Referring to FIG. 7, the cargo screen rail 300 includes a rotation shaft 310. The rotation shaft 310 is mounted to a first end portion of the cargo screen rail 300. The rotation shaft 310 is provided with a protrusion 311 which vertically protrudes from the rotation shaft 310.

The cargo screen rail 300 may be rotated around the rotation shaft 310 in the first direction and inserted into the side trim 200. Furthermore, the cargo screen rail 300 may be rotated in a second direction and inserted into the cargo screen rail mounting groove 110.

That is, when the cargo screen rail 300 is inserted into the cargo screen rail mounting groove 110, this means that a preparation for operating the cargo screen 500 has been completed. This state is similar to the state in which the cargo screen is mounted to the side trim in the conventional art. Furthermore, when the cargo screen rail 300 is inserted into the side trim 200, this state is similar to the state in which the cargo screen is removed from the side trim in the conventional art. Therefore, in an exemplary embodiment of the present invention, because there is no need to mount or remove the cargo screen, a comparatively long luggage can be easily loaded, compared to the conventional art.

Figure 8:
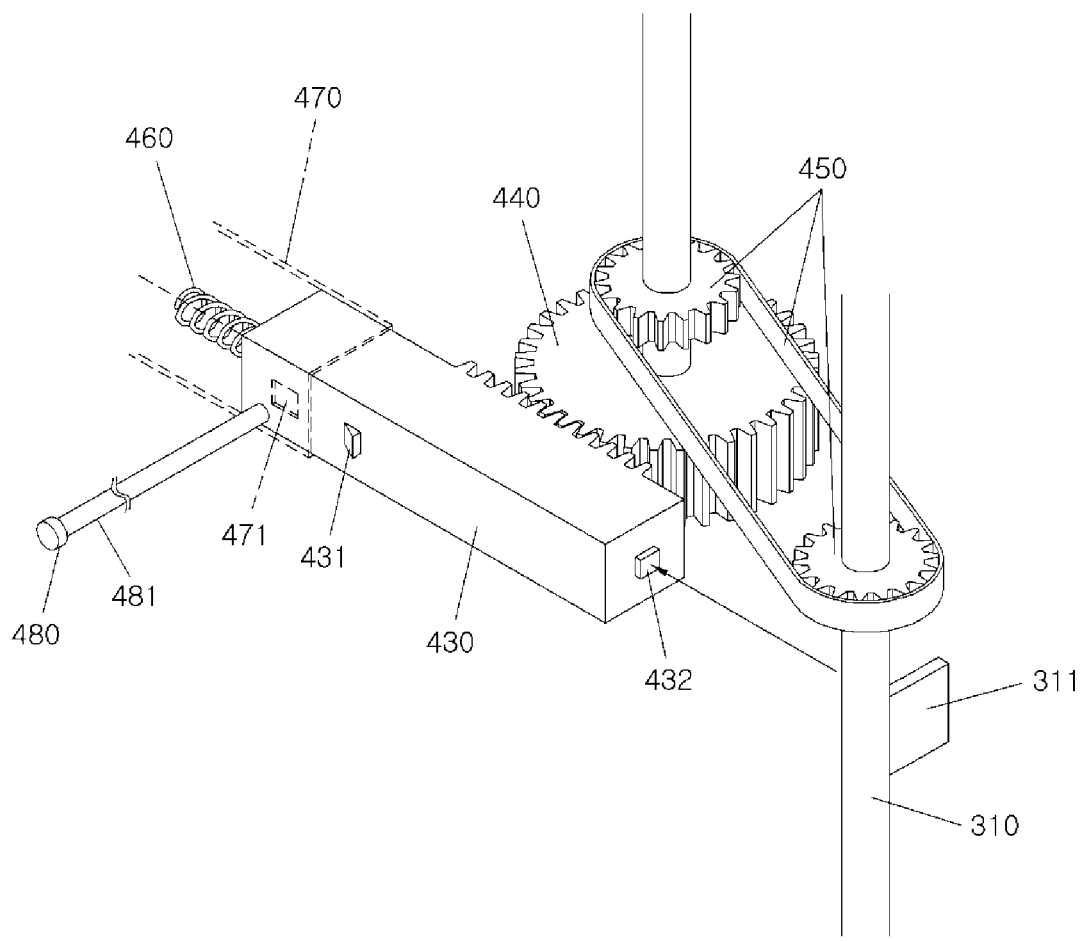
FIG. 8 is a schematic view of a gear spring assembly according to an exemplary embodiment of the present invention.

FIG. 8 is a schematic view of the gear spring assembly according to an exemplary embodiment of the present invention. Referring to FIG. 8, the gear spring assembly 400 according to an exemplary embodiment of the present invention is mounted to the rotation shaft 310 and is configured to rotate the cargo screen rail 300 in the second direction.

The gear spring assembly 400 includes a coil spring 410 and a gear damper 420. The coil spring 410 is configured to apply force to the rotation shaft 310 such that the cargo screen rail 300 rotates in the second direction. The gear damper 420 is configured to reduce the rotating speed of the rotation shaft 310. That is, when a driver (or a user) applies force to the cargo screen rail 300 in the first direction and releases the latch structure 600, the cargo screen rail 300 is automatically removed from the side trim 200 by the restoring force of the coil spring 410 and thus rotated in the second direction.

The gear spring assembly 400 includes a rack gear 430, a pinion gear 440, a gear link 450, a rack gear spring 460, a locking device 470 and a button device 480. A first end portion of the rack gear 430 comes into contact with the protrusion 311 when the rotation shaft 310 rotates in the second direction. Due to this contact, the rack gear 430 converts rotational motion of the rotation shaft 310 into linear motion so that the rack gear 430 moves away from the rotation shaft 310.

In this regard, to easily convert the rotational motion of the rotation shaft 310 into the linear motion, the first end portion 432 of the rack gear 430 may have a protrusion structure. Furthermore, the protrusion 311 and the first end portion of the rack gear 430 may be formed such that a predetermined angle is formed therebetween.

The pinion gear 440 is rotated by movement of the rack gear 430. The gear link 450 is configured to transmit rotating force of the pinion gear 440 to the rotation shaft 310 and rotate the rotation shaft 310 in the second direction. That is, the cargo screen rail 300 is rotated by the restoring force of the coil spring 410 from the side trim 200 to a first position. From the first position to a second position (that is, the cargo screen rail mounting groove), the cargo screen rail 300 is rotated by the rotating force of the coil spring 410 and the rotating force of the pinion gear 440 (in other word, the rotating force transmitted by the gear link).

The rack gear spring 460 is mounted to a second end portion of the rack gear 430 so that, when the rotation shaft 310 rotates in the second direction, the rack gear spring 460 is compressed by the movement of the rack gear 430. The locking device 470 is configured to maintain the rack gear spring 460 in the compressed state when the cargo screen rail 300 is mounted to the cargo screen rail mounting groove 110 by the rotation of the rotation shaft 310 in the second direction. The locking device 470 may have a structure such that a hole 471 is formed in the body of the locking device 470 and a support 431 protruding from the rack gear 430 is removably locked to the hole 471, in a manner similar to that of a typical ballpoint structure. However, it is not limited to this. Depending on intentions or the like of the designer, another structure may be used.

That is, at the second position, the coil spring 410 has little restoring force, and the rack gear spring 460 is in the maximally compressed state. However, the rack gear spring 460 is maintained in the compressed state by the locking device 470 without being restored. Therefore, the cargo screen rail 300 can be mounted at the second position, that is, in the cargo screen rail mounting groove 110, and maintained in this state unless the driver (or the user) conducts separate manipulation.

The button device 480 is configured to release the rack gear 430 from the locking device 470 through a link structure 481 so that the rotation shaft 310 is rotated in the first direction by the restoring force of the rack gear spring 460. That is, the driver (or the user) may push the button device 480 to release the cargo screen rail 300 from the cargo screen rail mounting groove 110.

In the instant case, the rack gear 430 is released from the locking device 470, and the rack gear 430 is moved toward the protrusion 311 by the restoring force of the rack gear spring 460. Here, the rotation shaft 310 begins to rotate in the first direction both by the force applied to the protrusion 311 and by the rotating force of the pinion gear 440 generated by the movement of the rack gear 430.

However, as the rotation shaft 310 rotates in the first direction, the restoring force of the coil spring 410 is generated in the second direction. Therefore, the forces in both directions are in equilibrium at a predetermined point. This point may be the first position of FIG. 5.

When the cargo screen rail 300 reaches the first position, the driver (or the user) applies force to the cargo screen rail 300 in the first direction and thus is configured to insert the cargo screen rail 300 into the side trim 200. After the insertion, the cargo screen rail 300 is locked to the side trim 200 by the latch structure 600, thus entering a state similar to the state in which the cargo screen is removed in the conventional art. Therefore, in an exemplary embodiment of the present invention, there is no need to mount or remove the cargo screen. Thus, a comparatively long luggage can be easily loaded, compared to the conventional art.

Figure 9:
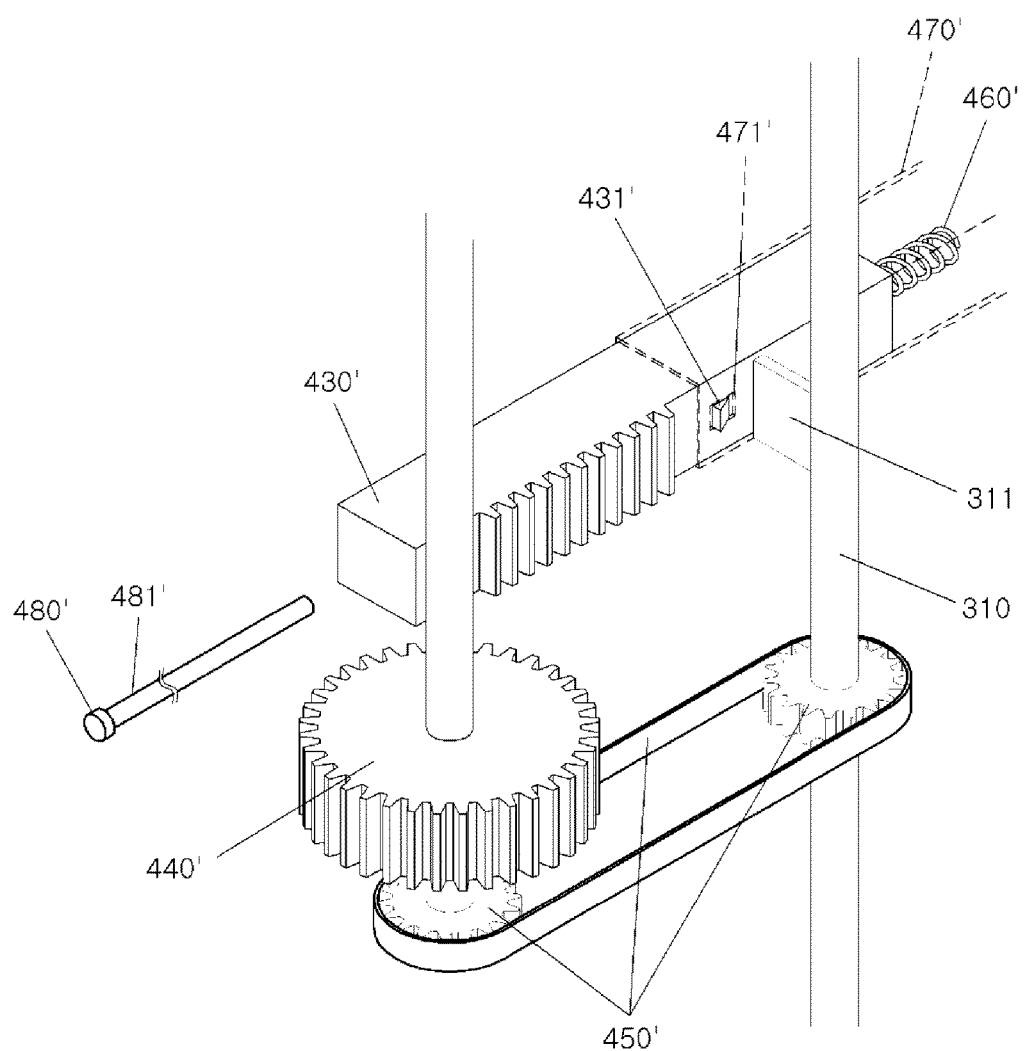
FIG. 9 is a schematic view of a gear spring assembly according to another exemplary embodiment of the present invention.

FIG. 9 is a schematic view of a gear spring assembly according to another exemplary embodiment of the present invention. Referring to FIG. 9, the gear spring assembly 400 includes a second rack gear 430', a second pinion gear 440', a second gear link 450', a second rack gear spring 460', a second locking device 470', and a second button device 480'.

The second pinion gear 440' is rotated by the movement of the second rack gear 430'. The second gear link 450' is configured to transmit the rotating force of the second pinion gear 440' to the rotation shaft 310 and thus rotate the rotation shaft 310 in the second direction.

The second locking device 470' is configured to maintain the second rack gear spring 460' in a compressed state. When the rotation shaft 310 rotates in the second direction, the second locking device 470' is unlatched by the protrusion 311. In this regard, the second locking device 470' may have a structure such that a second hole 471' is formed in the body of the locking device 470' and a second support 431' protruding from the second rack gear 430' is removably locked to the second hole 471', in a manner similar to that of a typical ballpoint structure. However, it is not limited to this. Depending on intentions or the like of the designer, another structure may be used.

The second button device 480' is configured to apply force to the second rack gear 430' through a second link structure 481' in a direction in which the second rack gear spring 460' is compressed, so that the second rack gear spring 460' can be maintained in the state of having been compressed by the second locking device 470'.

That is, when the cargo screen rail 300 is rotated from the side trim 200 to the first position by the restoring force of the coil spring 410, the protrusion 311 comes into contact with the support 431', whereby the second rack gear 430 is released from the second locking device 470'.

Therefore, the second rack gear 430 is moved by the restoring force of the second gear spring 460'. The second pinion gear 440' is rotated by the movement of the second rack gear 430'.

Accordingly, the second gear link 450' transmits the rotating force of the second pinion gear 440' to the rotation shaft 310 and thus rotates the rotation shaft 310 in the second direction. As a result, the cargo screen rail 300 is rotated from the side trim 200 to the second position.

Furthermore, when the driver (or the user) operates the second button device 480', the force is applied to the second rack gear 430' through the second link structure 481', whereby the second rack gear spring 460' is compressed. Then, due to the movement of the second rack gear 430', the second pinion gear 440' applies rotating force to the rotation shaft 310 such that the second pinion gear 440' is rotated in the first direction. Accordingly, the cargo screen rail 300 is rotated from the second position to the first position.

Subsequently, when the cargo screen rail 300 reaches the first position, the driver (or the user) applies force to the cargo screen rail 300 in the first direction and thus is configured to insert the cargo screen rail 300 into the side trim 200. After the insertion, the cargo screen rail 300 is locked to the side trim 200 by the latch structure 600, thus entering a state similar to the state in which the cargo screen in the conventional art is removed. Therefore, in an exemplary embodiment of the present invention, there is no need to mount or remove the cargo screen. Thus, a comparatively long luggage can be easily loaded, compared to the conventional art.

Figure 10:
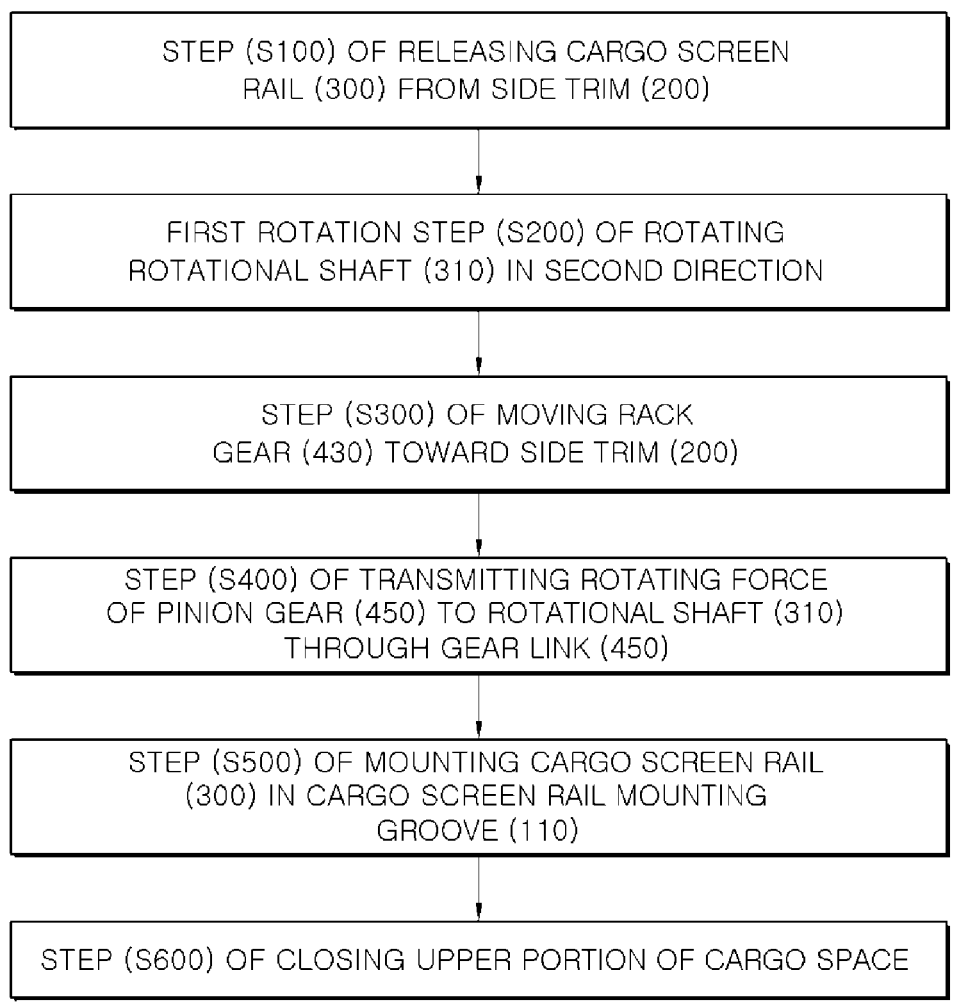
FIG. 10 is a flowchart of a method of operating the cargo screen assembly according to an exemplary embodiment of the present invention.

FIG. 10 is a flowchart of a method of operating the cargo screen assembly according to an exemplary embodiment of the present invention. Referring to FIG. 10, the method of operating the cargo screen assembly according to an exemplary embodiment of the present invention may include step S100 of applying force to the second end portion of each of the cargo screen rails 300 in the first direction to release the latch structure 600, and releasing each of the cargo screen rails 300 from the corresponding side trim 200; a first rotation step S200 of rotating the rotation shaft 310 of the cargo screen rail 300 in the second direction by the restoring force of the coil spring 410; step S300 of bringing the protrusion 311 of the rotation shaft 310 into contact with the rack gear 430 and thus moving the rack gear 430 toward the side trim 200; step S400 of rotating the pinion gear 440 by the movement of the rack gear 430, and transmitting the rotating force of the pinion gear 440 to the rotation shaft 310 through the gear link 450; and step S500 of mounting the cargo screen rail 300 in the cargo screen rail mounting groove 110 using the rotating force.

The method of operating the cargo screen assembly further includes step S600 of moving each of the cargo screens 500 along the corresponding cargo screen rail 300 that is mounted in the cargo screen rail mounting groove 110, and coupling the cargo screen 500 with the opposite side cargo screen 500 to close the upper portion of the cargo space.

Figure 11:
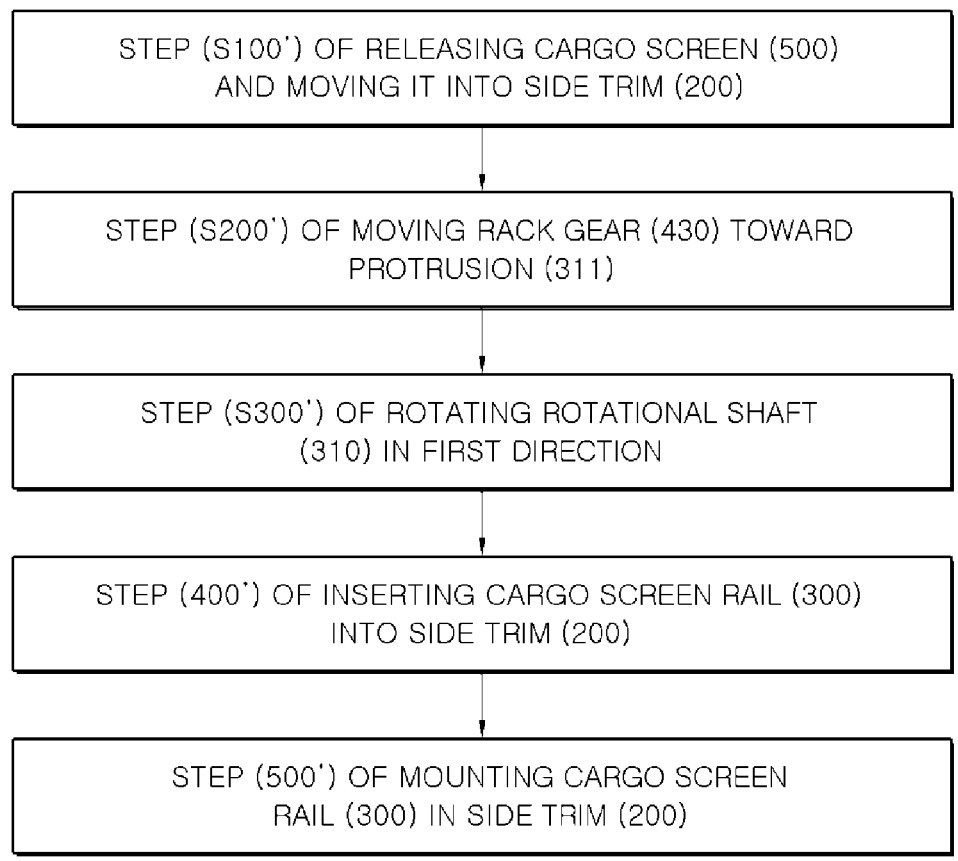
FIG. 11 is a flowchart of a method of releasing the cargo screen assembly according to an exemplary embodiment of the present invention.

FIG. 11 is a flowchart of a method of releasing the cargo screen assembly according to an exemplary embodiment of the present invention. Referring to FIG. 11, the method of releasing the cargo screen assembly according to an exemplary embodiment of the present invention may include step S100' of separating the cargo screens 500 that have been coupled to each other, and moving each cargo screen 500 into the corresponding side trim 200; step S200' of operating the button device 480 to release the locking device 470 through the link structure, and moving the rack gear 430 toward the protrusion 311 using the restoring force of the rack gear spring 460; step S300' of applying force from the rack gear 430 to the protrusion 311, and rotating the rotation shaft 310 in the first direction; step S400' of inserting each of the cargo screen rails 300 into the corresponding side trim 200 by applying force to the second end portion of the cargo screen rail 300 in the first direction after the step S300'; and step S500' of locking the cargo screen rail 300 in the side trim 200 by the latch structure 600.

Figure 12:
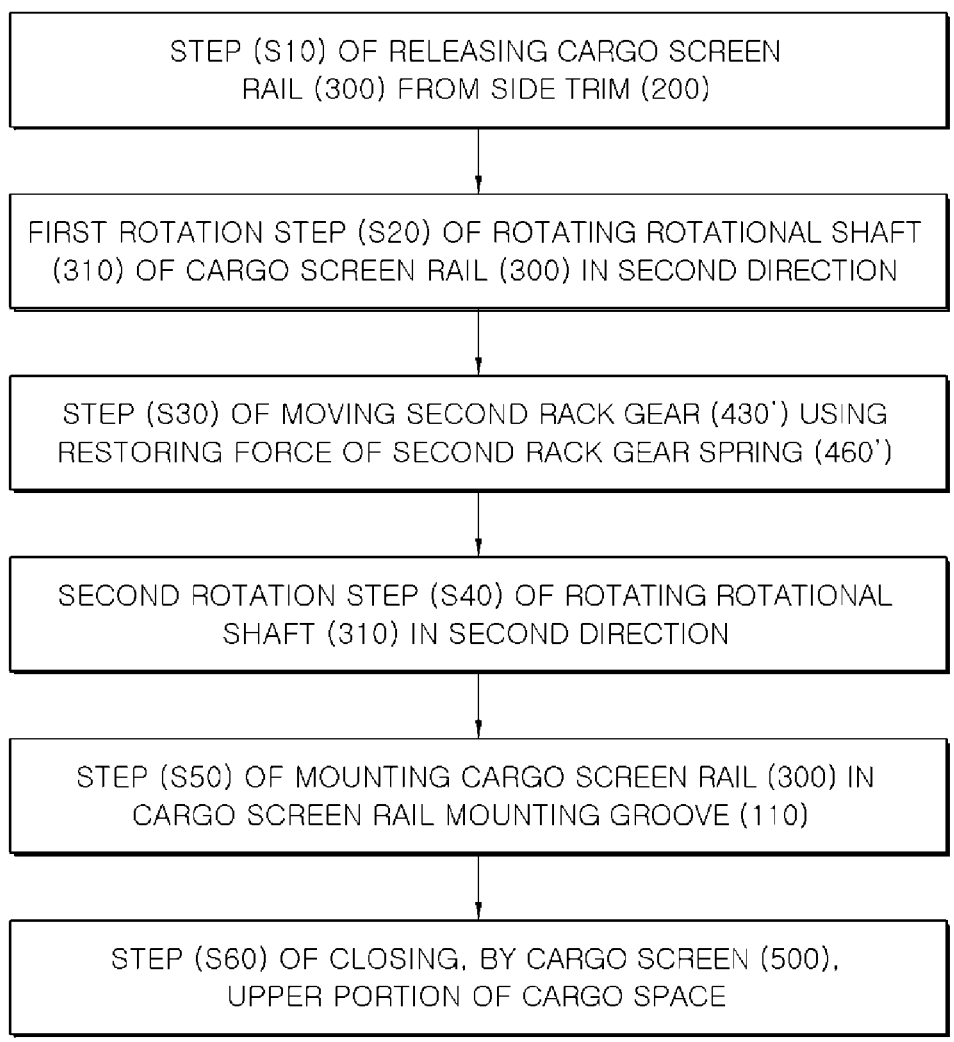
FIG. 12 is a flowchart of a method of operating the cargo screen assembly according to another exemplary embodiment of the present invention.

FIG. 12 is a flowchart of a method of operating the cargo screen assembly according to another exemplary embodiment of the present invention. Referring to FIG. 12, the method of operating the cargo screen assembly according to the present exemplary embodiment of the present invention includes: step S10 of applying force to the second end portion of each of the cargo screen rails 300 in the first direction to release the latch structure 600, and releasing the cargo screen rail 300 from the corresponding side trim 200; a first rotation step S20 of rotating the rotation shaft 310 of the cargo screen rail 300 in the second direction using the restoring force of the coil spring 410; step S30 of bringing the protrusion 311 of the rotation shaft 310 into contact with the second support 431' of the second rack gear 430' to release the second rack gear 430' from the second locking device 470', and moving the second rack gear 430' using the restoring force of the second rack gear spring 460'; a second rotation step S40 of rotating the second pinion gear 440' by the movement of the second rack gear 430', transmitting the rotating force of the second pinion gear 440' to the rotation shaft 310 by the second gear link 450', and rotating the rotation shaft 310 in the second direction; and step S50 of mounting the cargo screen rail 300 in the cargo screen rail mounting groove 110 using the rotating force.

The method of operating the cargo screen assembly further includes step S60 of moving each of the cargo screens 500 along the cargo screen rail 300 that is mounted in the cargo screen rail mounting groove 110, and coupling the cargo screen 500 with the opposite side cargo screen 500 to close the upper portion of the cargo space.

Figure 13:
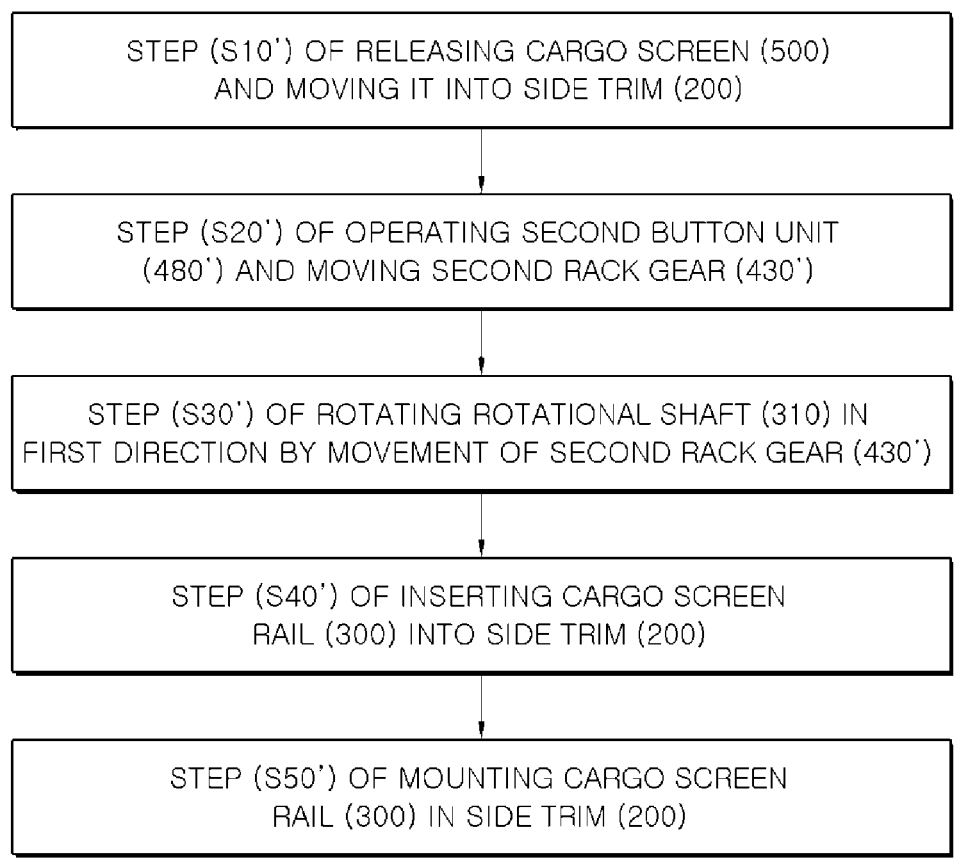
FIG. 13 is a flowchart of a method of releasing the cargo screen assembly according to another exemplary embodiment of the present invention.

FIG. 13 is a flowchart of a method of releasing the cargo screen assembly according to another exemplary embodiment of the present invention. Referring to FIG. 13, the method of releasing the cargo screen assembly according to the present exemplary embodiment of the present invention includes: step S10' of separating the cargo screens 500 that have been coupled to each other, and moving each cargo screen 500 into the corresponding side trim 200; step S20' of operating the second button device 480' to move the second rack gear 430' through the second link structure 481' in a direction in which the second rack gear spring 460' is compressed, and maintaining the second rack gear spring 460' in a compressed state using the second locking device 470'; step S30' of rotating the second pinion gear 440' using the movement of the second rack gear 430', and rotating the rotation shaft 310 in the first direction by the rotating force of the second pinion gear 440'; step S40' of inserting the cargo screen rail 300 into the side trim 200 by applying force to the second end portion of the cargo screen rail 300 in the first direction after the step S300'; and step S50' of locking the cargo screen rail 300 in the side trim 200 by the latch structure 600.

As described above, according to an exemplary embodiment of the present invention, even when comparatively long luggage is loaded, cargo screen rails have to be inserted into respective side trims before a rear seat is folded. That is, because there is no need to mount or detach cargo screens themselves, a process of loading the long luggage can be facilitated.

Furthermore, since a wheel is mounted to each cargo screen, the operation of the cargo screen can be facilitated.

In addition, because the left and right cargo screens are easily coupled to each other by coupling parts that include magnetic material, an operation of closing a cargo space can be easily performed.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cargo screen assembly for opening or closing an upper portion of a cargo space defined between a rear seat and a back door of a vehicle, the cargo screen assembly including:
    a cargo screen rail mounting groove formed horizontally in a rear surface of the rear seat of the vehicle;
    a plurality of side trims protruding rearward from respective opposite end portions of the rear surface of the rear seat;
    a plurality of cargo screen rails configured to be inserted into the respective side trims or the cargo screen rail mounting groove; wherein each of the cargo screen rails includes a first end portion and a second end portion; and
    a latch structure mounted in each of the side trims at a point at which the side trims make contact with the second end portion of a corresponding cargo screen rail, the latch structure being configured to lock the corresponding cargo screen rail to a corresponding side trim or release the corresponding cargo screen rail from the corresponding side trim.

2. The cargo screen assembly of claim 1, wherein the cargo screen rail includes:
    a rotation shaft mounted to the first end portion of each of the cargo screen rails and configured to rotate the corresponding cargo screen rail in a first direction so that each of the cargo screen rails is inserted into the associated side trim, or to rotate the corresponding cargo screen rail in a second direction so that the corresponding cargo screen rail is inserted into the cargo screen rail mounting groove.

3. The cargo screen assembly of claim 2, further including:
    a gear spring assembly mounted to the rotation shaft and configured to rotate the corresponding cargo screen rail in the second direction.

4. The cargo screen assembly of claim 1, further including:
    cargo screens each including a first end portion mounted in the corresponding side trim, and a second end portion provided to be movable along the corresponding cargo screen rail mounted in the cargo screen rail mounting groove.

5. The cargo screen assembly of claim 4, wherein each of the cargo screens includes:
    a wheel mounted to a first side of the second end portion of each of the cargo screens and inserted into the corresponding cargo screen rail to be movable along the corresponding cargo screen rail; and
    a coupling part mounted to the second end portion of each of the cargo screens, the coupling part being coupled to the second end portion of the opposite side cargo screen to close the upper portion of the cargo space.

6. The cargo screen assembly of claim 5,
    wherein each of the cargo screens includes a plurality of panels,
    wherein when the second end portion of each of the cargo screens is moved into the corresponding side trim, the plurality of panel are stacked in the corresponding side trim or wound in a form of a roll in the corresponding side trim to open the upper portion of the cargo space, and
    wherein when the second end portion of each of the cargo screens is moved along the corresponding cargo screen rail, the plurality of panels are deployed along the cargo screen rail or unwound in a form of a roll to close the upper portion of the cargo space.

7. The cargo screen assembly of claim 1, wherein the latch structure is configured such that, while the corresponding cargo screen rail is locked to the corresponding side trim, when force is applied to the second end portion of the corresponding cargo screen rail in the first direction, the latch structure is unlatched.

8. The cargo screen assembly of claim 3, wherein the gear spring assembly includes:
    a coil spring configured to apply force to the rotation shaft so that the corresponding cargo screen rail rotates in the second direction; and
    a gear damper configured to reduce a speed at which the rotation shaft rotates.

9. The cargo screen assembly of claim 8,
    wherein the rotation shaft includes a protrusion protruding vertically from the rotation shaft, and
    wherein the gear spring assembly includes a rack gear configured, wherein when the rotation shaft rotates in the second direction, a first end portion of the rack gear contacts with the protrusion, and a rotational motion of the rotation shaft is converted into a linear motion by the contact, wherein the rack gear is moved away from the rotation shaft.

10. The cargo screen assembly of claim 9, wherein the gear spring assembly includes:
    a pinion gear configured to be rotated by movement of the rack gear; and
    a gear link configured to transmit rotating force of the pinion gear to the rotation shaft and rotate the rotation shaft in the second direction.

11. The cargo screen assembly of claim 10, wherein the gear spring assembly further includes:
    a rack gear spring mounted to a second end portion of the rack gear so that when the rotation shaft rotates in the second direction, the rack gear spring is compressed by movement of the rack gear.

12. The cargo screen assembly of claim 11, wherein the gear spring assembly further includes:
    a locking device configured to maintain the rack gear spring in a compressed state when the cargo screen rail is mounted in the cargo screen rail mounting groove by rotation of the rotation shaft in the second direction.

13. The cargo screen assembly of claim 12, wherein the gear spring assembly further includes:
    a button device configured to release the rack gear from the locking device through a link structure so that the rotation shaft is rotated in the first direction by restoring force of the rack gear spring.

14. The cargo screen assembly of claim 8,
    wherein the rotation shaft includes a protrusion protruding vertically from the rotation shaft, and wherein the gear spring assembly includes:
a second rack gear;
a second pinion gear configured to be rotated by movement of the second rack gear;
a second gear link configured to transmit rotating force of the second pinion gear to the rotation shaft and rotate the rotation shaft in the second direction; and
a second rack gear spring mounted to a first end portion of the second rack gear and configured to apply restoring force to the second rack gear so that the second rack gear is moved.

15. The cargo screen assembly of claim 14, wherein the gear spring assembly further includes:
a second locking device configured to maintain the second rack gear spring in a compressed state and configured such that, when the rotation shaft rotates in the second direction, the second locking device is unlatched by the protrusion.

16. The cargo screen assembly of claim 15, wherein the gear spring assembly further includes:
a second button device configured to apply force to the second rack gear through a second link structure in a direction in which the second rack gear spring is compressed, so that the second rack gear spring is maintained in a state of having been compressed by the second locking device.

17. A method of operating the cargo screen assembly of claim 1, including:
an operation of applying force to the second end portion of each of the cargo screen rails in the first direction to release a corresponding latch structure, and releasing the cargo screen rail from the corresponding side trim;
a first rotation operation of rotating the rotation shaft of the cargo screen rails in the second direction by restoring force of a coil spring;
an operation of bringing a protrusion of the rotation shaft into contact with a rack gear and thus moving the rack gear in a direction away from the rotation shaft;
an operation of rotating a pinion gear by a movement of the rack gear, and transmitting rotating force of the pinion gear to the rotation shaft through a gear link; and
an operation of mounting the cargo screen rail in the cargo screen rail mounting groove using the rotating force.

18. The method of claim 17, further including:
an operation of moving each of cargo screens along the cargo screen rail mounted in the cargo screen rail mounting groove, and coupling the cargo screens with the opposite side cargo screen among the cargo screens to close the upper portion of the cargo space.

19. A method of releasing a mounting structure of the cargo screen assembly of claim 13, comprising:
an operation of separating the cargo screens that have been coupled to each other, and moving each of the cargo screens into the corresponding side trim;
an operation of operating the button device to release the locking device through the link structure, and moving the rack gear toward the protrusion using restoring force of the rack gear spring;
an operation of applying force from the rack gear to the protrusion and rotating the rotation shaft in the first direction;
an operation of inserting each of the cargo screen rails into the corresponding side trim by applying force to the second end portion of the cargo screen rails in the first direction after the operation; and
an operation of locking the cargo screen rails in the side trims by the latch structure.

20. A method of operating the cargo screen assembly of claim 8, including:
an operation of applying force to the second end portion of each of the cargo screen rails in the first direction to release the corresponding latch structure, and releasing the cargo screen rails from the corresponding side trim;
a first rotation step of rotating the rotation shaft of the cargo screen rails in the second direction by restoring force of the coil spring;
an operation of bringing a protrusion of the rotation shaft into contact with a second support of a second rack gear to release the second rack gear from a second locking device, and moving the second rack gear using restoring force of a second rack gear spring;
a second rotation operation of rotating a second pinion gear by a movement of the second rack gear, transmitting rotating force of the second pinion gear to the rotation shaft by a second gear link, and rotating the rotation shaft in the second direction; and
an operation of mounting the cargo screen rails in the cargo screen rail mounting groove using the rotating force.

21. The method of claim 20, further including:
an operation of moving each of the cargo screens along the cargo screen rails mounted in the cargo screen rail mounting groove, and coupling the cargo screens with the opposite side cargo screen among the cargo screens to close the upper portion of the cargo space.

22. A method of releasing a mounting structure of the cargo screen assembly of claim 16, including:
an operation of separating the cargo screens that have been coupled to each other, and moving each of the cargo screens into a corresponding side trim;
an operation of operating the second button device to move the second rack gear through the second link structure in a direction in which the second rack gear spring is compressed, and maintaining the second rack gear spring in a compressed state using the second locking device;
an operation of rotating the second pinion gear using a movement of the second rack gear, and rotating the rotation shaft in the first direction by rotating force of the second pinion gear;
an operation of inserting each of the cargo screen rails into the corresponding side trim by applying force to the second end portion of the cargo screen rail in the first direction after the operation; and
an operation of locking the cargo screen rails in the side trims by the latch structure.

* * * * *